S. W. EVANS.
BIRD TRAP.
APPLICATION FILED AUG. 5, 1911.
1,029,053.
Patented June 11, 1912.
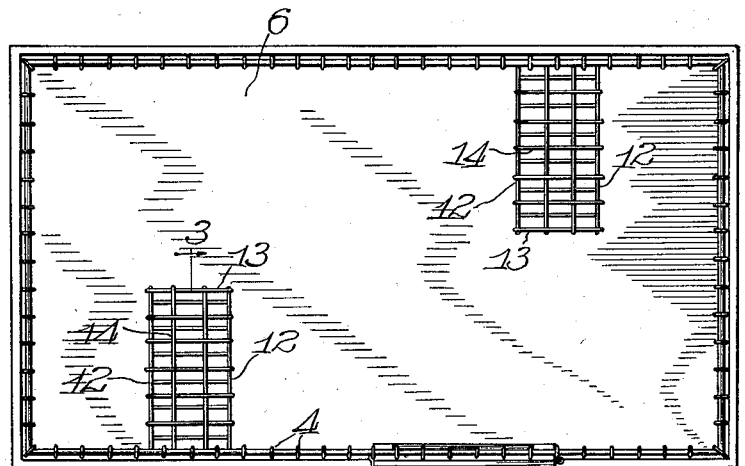
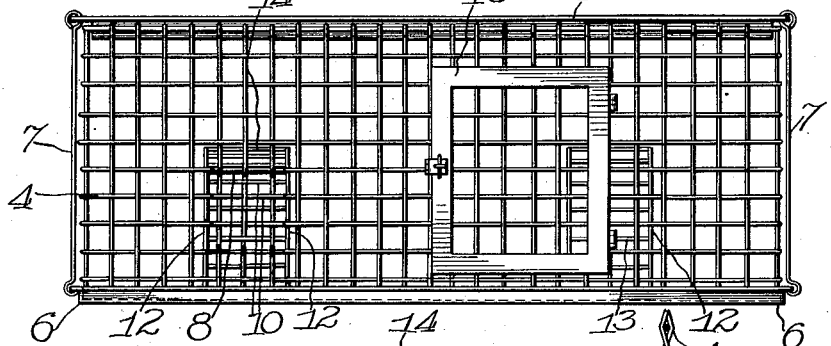
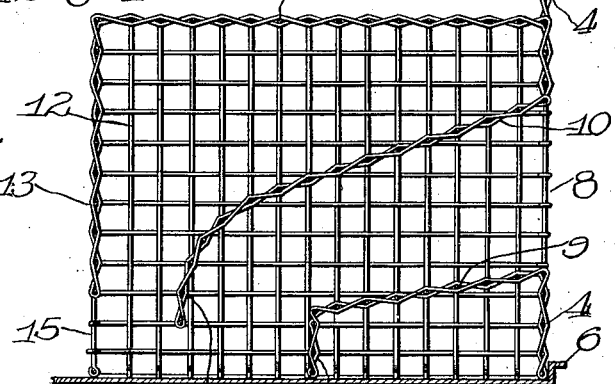

UNITED STATES PATENT OFFICE.

SAMUEL W. EVANS, OF BLOOMINGTON, ILLINOIS.

BIRD-TRAP.

1,029,053.  Specification of Letters Patent.  Patented June 11, 1912.

Application filed August 5, 1911. Serial No. 642,552.

*To all whom it may concern:*

Be it known that I, SAMUEL W. EVANS, a citizen of the United States, residing at Bloomington, in the county of McLean and State of Illinois, have invented certain new and useful Improvements in Bird-Traps, of which the following is a full, clear, and exact specification.

My invention relates more particularly to traps for catching small birds, such as sparrows, without necessarily injuring them, and it has for its primary object to provide an improved and simple form of bird trap which shall be free from any moving device or be liable to deter the bird from entering the trap, or capable of being moved by those which have already entered, in such a way as to deter others from entering.

A further object of the invention is to provide an improved and simple form of bird trap whose capacity for entrapping birds will be limited only by the cubic dimensions thereof, and which will be free from devices whereby the trap is sprung or rendered incapable of catching another bird after the first one has been caught until the trap is again set.

A still further object of the invention is to provide an improved and simple form of bird trap having inlet passages and opening so arranged and combined that after the bird has once entered the main compartment of the trap, it will be unable to readily perceive the opening or passage through which it entered.

With a view to the attainment of these ends and the accomplishment of certain other objects which will hereinafter appear, the invention consists in certain features of novelty in the construction, combination and arrangement of parts which will now be described with reference to the accompanying drawings, and more particularly pointed out in the claims.

In the said drawings—Figure 1 is a plan view of a bird trap embodying this invention with the top removed. Fig. 2 is a side elevation thereof; and Fig. 3 is an enlarged vertical detail section taken on the line 3—3, Fig. 1.

The main compartment of the cage is preferably composed of side walls 4 made of wire netting or other suitable material, and top and bottom members 5, 6, composed of sheet metal or other suitable material, and clamped together against the side walls by means of hooks or rods 7 so that when desired the bottom may be readily removed. The bottom may be in the form of a pan or tray into which the edges of the side walls are seated, while the top is of similar form having a depressed portion of the pan or tray situated within the side walls so as to prevent collapse of the latter.

Two of the diametrically opposite side walls are provided near their lower edges with inlet apertures 8, and at the lower edge of each of these is arranged a walk or incline 9 extending inwardly and downwardly therefrom for the birds to walk on when entering the trap. This walk or incline is covered by a screen 10, which extends inwardly and downwardly from the top edge of the opening 8 and has its inner end curved downwardly to such a degree as to bring it below the level of the inner end of the incline 9, which latter, as shown in Fig. 3, has its inner end supported a considerable distance above the bottom 6 by a short section of vertical wall 11, preferably constituting a continuation of the incline 9, which is made of wire netting or screen. The lower curved extremity $10^a$ of the member 10, however, is situated some distance from the extremity of the incline 9, so that after the bird reaches the end of the incline 9, it will be induced to hop off on to the bottom 6, and being then prevented by the wall section 11 from retreating under the incline 9, and with its head directly under the curved end $10^a$, it will naturally be induced by the narrow confines of the passageway to move forward or inward through the passage left under the end $10^a$ rather than make a retrograde movement.

The inclines 9 and 10 constitute the bottom and top respectively of the inlet passageway, while the sides of this passageway are constituted by side walls 12 which extend inwardly from the side edges of the opening 8 in the wall 4, and support and inclose the inclines 9, 10. These side walls 12 also extend inwardly beyond the extremity of the incline 10, as shown in Fig. 3, and are provided at some distance from the incline 10 with an end wall 13, which adjoins a top portion 14 extending horizontally in an outward direction to the side wall 4 at some distance above the incline 10, thus completing an inner compartment or inclosure for the inclines 9 and 10. The end wall 13 of this inner compartment or inclosure is provided at the bottom with an opening 15 which permits the bird to enter the main compartment of the cage formed by the side walls 4 and top and bottom 5 and 6. This opening 15, it will be seen, is situated below the level of the opening 8 and the downwardly curved end 10ª is carried below the top of the opening 15, which, as before said, is also below the inner end of the incline 9, so as to constitute a mask for completely hiding the passageway over the incline 9 to the outer opening 8 after the bird has once passed through the opening 15. The distance between the vertical wall 11 and the mask 10ª, as well as the distance between the latter and the wall 13, is about the length of the bird to be entrapped, or slightly less than the same, so that after the bird hops off the incline 9 on to the bottom 6 in its effort to reach the bait sprinkled along the bottom 6, it will find itself more or less crowded for room, and therefore will be induced to pass under the mask 10ª rather than attempt to turn around or to back out over the incline 9, and after passing under the mask 10ª, its natural course will be through the opening 15 rather than attempting to turn in the narrow confines of the space between the end wall 13 and the mask 10ª. By covering the inclines 9 and 10 by means of the side walls 12, end wall 13 and top portion 14, the passageway through which the bird entered is disguised, and a false passageway is formed above the incline 10. The natural tendency of a bird in its effort to escape being always to fly upwardly or to choose an upward passage rather than a downward passage, it is seen that should the bird finally find the opening 15, its head after passing through said opening would naturally be above the lower end of the mask 10ª, and as this mask and the top of the incline 10 present an apparent avenue of escape, the bird would naturally pass over the incline 10 rather than under it. Finding itself trapped in the space above the incline 10, it would naturally pass through the opening 15 again, should it retrace its steps in an effort to escape from the compartment or inclosure above the incline 10, because, in descending from the incline 10, its own body would fill and exclude from its observation the passage below the extremity of the mask 10ª, leaving the opening 15 as the only apparent avenue of escape from the confines of the mask 10ª and side walls 12.

One wall of the main compartment may be provided with a door 16 for the removal of the birds.

What I claim is:

1. In a bird trap the combination of a main inclosure, an inner compartment therefor adjacent one wall thereof, said wall having an aperture formed therethrough into said compartment, and a passageway extending from said aperture inwardly into said compartment and having its outlet presented downwardly adjacent the bottom of the trap, said inner compartment having communication with the main inclosure adjacent the inner end of said passageway.

2. In a bird trap the combination of a main inclosure, an inner compartment adjacent one wall of said inclosure, said wall having an aperture formed therethrough into said compartment and spaced from the bottom of the trap, a walk for the birds extending inwardly from the lower edge of said aperture and terminating in said inner compartment at a point removed from both ends thereof, an upright wall section extending downwardly from the inner end of said walk to the bottom of the trap and across the said inner compartment, the member 10 extending inwardly from the upper edge of said aperture and across the said inner compartment to form with said walk a passageway, the inner end of said member 10 being turned downwardly below the level of the inner end of said walk and terminating at a distance from the bottom of the trap to form an exit for the bird, said down turned end of the member 10 being spaced from the inner wall of said inner compartment, the said inner wall having an exit at the lower edge thereof into the main inclosure, extending above the extremity of the down turned end of said member 10 and said member 10 being situated below the top of said inner compartment and forming therewith a false passage.

In testimony whereof I have signed my name to this specification, in the presence of two subscribing witnesses, on this 21st day of November A. D. 1910.

SAMUEL W. EVANS.

Witnesses:
 GEORGE JOHNSON,
 JOHN W. VANCE.